(12) United States Patent
Riach

(10) Patent No.: US 7,735,176 B2
(45) Date of Patent: Jun. 15, 2010

(54) SWEEPING MACHINE WITH VARIABLE WHEEL TRACKING

(75) Inventor: Alan B. Riach, Bathgate (GB)

(73) Assignee: Tennant N.V., Uden (NL)

( * ) Notice: Subject to any disclaimer, the term of this patent is extended or adjusted under 35 U.S.C. 154(b) by 1221 days.

(21) Appl. No.: 10/496,051

(22) PCT Filed: Nov. 19, 2002

(86) PCT No.: PCT/GB02/05213

§ 371 (c)(1),
(2), (4) Date: Jul. 6, 2004

(87) PCT Pub. No.: WO03/046291

PCT Pub. Date: Jun. 5, 2003

(65) Prior Publication Data

US 2005/0039278 A1    Feb. 24, 2005

(30) Foreign Application Priority Data

Nov. 20, 2001   (GB)   ................................. 0127838.1

(51) Int. Cl.
*E01H 1/02*   (2006.01)
(52) U.S. Cl. ................. 15/87; 15/78; 180/444
(58) Field of Classification Search .............. 15/87, 15/78, 79.2, 88.2; 134/6; 180/444, 446, 180/421, 443
See application file for complete search history.

(56) References Cited

U.S. PATENT DOCUMENTS

| | | | | |
|---|---|---|---|---|
| 2,099,194 A | * | 11/1937 | Brown | .......................... 180/340 |
| 3,531,137 A | * | 9/1970 | Ganz et al. | .................. 280/638 |
| 3,782,491 A | | 1/1974 | Herbenar | |
| 3,887,959 A | | 6/1975 | Matsuo | |
| 4,258,825 A | * | 3/1981 | Collins | ......................... 182/14 |
| 4,290,820 A | * | 9/1981 | Swisher et al. | .................. 134/6 |
| 4,831,684 A | * | 5/1989 | Duncan | ...................... 15/340.1 |
| 4,986,386 A | | 1/1991 | Iwamoto et al. | |
| 5,797,203 A | * | 8/1998 | Vanderlinden | ................ 37/227 |

(Continued)

FOREIGN PATENT DOCUMENTS

DE            19644476 A      4/1997

(Continued)

*Primary Examiner*—Lee D Wilson
(74) *Attorney, Agent, or Firm*—Stephen B. Salai, Esq.; Jodi A. Reynolds, Esq.; Harter Secrest & Emery LLP

(57) ABSTRACT

A compact sweeping vehicle has steerable front wheels of variable track with a minimum track dimension for sweeping and a maximum track dimension for travel to and from the workplace. The front wheels are steerable and independently driven by hydraulic motors and are each supported on extendable parts of a telescopic axle beam which is supported on trailing arms supported by ball joints from the chassis of the vehicle. The extendable parts are extended and retracted by track change cylinders and steering is by a hydraulic cylinder extending between the axle beam and a steering arm of a bell crank lever for one of the wheels, which is connected by a forwardly extending drag link to a bell crank forming part of a steering relay mechanism which is connected by a cross link to a second bell crank lever, one arm of which is connected to a rearwardly extending drag link to a steering arm of the other wheel.

18 Claims, 2 Drawing Sheets

U.S. PATENT DOCUMENTS

| | | | |
|---|---|---|---|
| 6,256,827 B1 * | 7/2001 | Vanderlinden | 15/87 |
| 6,836,919 B2 * | 1/2005 | Shinler | 15/78 |
| 7,313,839 B2 * | 1/2008 | Shinler | 15/49.1 |
| 2002/0138939 A1 * | 10/2002 | Smith et al. | 15/340.4 |
| 2002/0179116 A1 * | 12/2002 | Shinler | 134/6 |
| 2005/0039278 A1 * | 2/2005 | Riach | 15/87 |

FOREIGN PATENT DOCUMENTS

| | | |
|---|---|---|
| EP | 0 452 980 A | 10/1991 |
| GB | 2015440 A | 9/1979 |
| GB | 1558007 A | 12/1979 |
| GB | 2082986 A | 3/1982 |
| GB | 2306413 A | 10/1996 |
| GB | 2306413 A | 5/1997 |
| GB | 2311967 A | 10/1997 |
| GB | 2330809 A | 5/1999 |
| WO | WO 96 36500 A | 11/1996 |

* cited by examiner

SWEEPING MACHINE WITH VARIABLE WHEEL TRACKING

BACKGROUND OF THE INVENTION

1. Field of the Invention

This invention relates to a sweeping machine with variable wheel tracking.

Small compact sweeping machines are well known in the marketplace and comprise a four-wheeled vehicle with a cab at its front end behind which is a rubbish hopper capable of taking up to about a ton of rubbish or other material, the machines having steerable front wheels controllable from the cab and a pair of contra-rotating brushes extending forwardly in front of the cab and easily visible to the operator within the cab. The brushes are able to sweep a width varying from about 1 meter to 2 meters, the width of which is again controllable from within the cab. The machines are normally provided with a suction arrangement to pick up rubbish swept to a central location between the contra-rotating brushes and with some form of dust separation equipment to separate out dust from the exhaust air stream from the suction arrangement. The machines may be provided with other operator comforts such as full suspension, electronic control systems for reduced operator workload, heated windscreen, adjustable steering wheel, adjustable driver's seat, a forward tilting cab and air conditioning. It is also important that the machine has excellent operator visibility. In order to improve rear vision, a reversing camera may also be provided. It is also preferable to provide the machines with four-wheel drive to improve stability in wet conditions and for good kerb climbing.

2. Description of Related Art

The machine of the present invention is of the compact type and accordingly it needs to have a narrow wheel track to allow it to fit between bollards in shopping precincts, to allow it to sweep on foot paths and generally to minimise the disruption of pedestrians. However, because of the requirement for the narrow wheel track, and because of the weight of the rubbish which can be carried in the rubbish hopper behind the operator which hopper necessarily needs to sit in a upper area of the machine, the machine tends to be unstable and prone to tipping over. To prevent this tendency, manufacturers have in the past tried to lower the centre of gravity, but in a small compact machine this is not particularly easy, especially if the machine is to carry up to a ton of rubbish. Accordingly, in order to prevent tipping over of a full machine, it has been necessary in the past for manufacturers to have to limit the speed of the machine to approximately 10 miles per hour. However, when the speed of the machine is limited, this means that it takes some considerable time for the machine to travel to and from the job, i.e. from the depot of the local council to a city centre. Furthermore, of course, it also takes the machine some considerable time to return to the depot to tip the contents of the hopper once it is full. Accordingly, small or compact slow sweeping machines are not attractive and there is a requirement for a small fast sweeper, but it has to be safe and stable when it is travelling fast.

BRIEF SUMMARY OF THE INVENTION

According to the present invention, we provide a sweeping machine having a pair of wheels, which are of variable track. Preferably, the machine has two pairs of wheels wherein at least one of the pairs of wheels are of variable track. By variable track, we mean that the transverse spacing between the wheels can be varied. Preferably the machine is of the general type previously described, e.g. it has one or more of the features normally provided and/or as described above. By providing the machine with variable tracking, the wheels can be set to their narrow mode for sweeping but can then be adjusted to their wide mode for fast transport, e.g. between the work place and a council depot or other location.

Preferably, it is the front, steerable wheels of the sweeping machine which can have their track adjusted. Preferably, therefore, the front wheels are each supported on respective ends of a telescopic transverse axle beam, there being a pair of track change hydraulic cylinders, one extending between the chassis and a left hand end of the telescopic axle beam, and the other extending between the chassis and a right-hand end of the telescopic axle beam.

Preferably, each wheel is supported upon a wheel hub in normal manner which is mounted upon a wheel hub carrier pivotally supported in known manner on upper and lower outrigger arms on the respective ends of the telescopic axle beam by means of upper and lower king pin wheel swivel ball joints in known manner.

Preferably, the steering mechanism comprises only four lever components, only three links linking the lever components, and a system for rotating one of the lever components, the system being operable by the operator of the sweeping machine.

Preferably, steering of the front wheels is achieved using a hydrostatic system, the arrangement being such that operation of a steering wheel within the operator's cab will result in hydraulic fluid being delivered to a steering cylinder for steering the wheels. Preferably, the steering cylinder extends between a bracket on the telescopic axle beam and one arm of a bell crank lever attached to one of the wheel hub carriers, such that extension and retraction of the steering cylinder will cause pivotal movement of the bell crank lever about the upper and lower swivel ball joints or king pin axis for the respective wheel.

In order to transfer steering movement of the wheel associated with the bell crank lever to the other wheel, the other arm of the bell crank lever provides a steering arm for connection to a steering arm of the opposite wheel. Because the two front wheels have variable spacing due to the variable tracking, it is not possible directly to connect the two steering arms together because their transverse spacing is of course adjustable. Accordingly, it is necessary to mount the whole of the telescopic axle beam, not directly on the chassis of the sweeping machine but, instead, on a pair of trailing arms which themselves are supported at their front ends by means of trailing arm ball joints. Accordingly, each of the trailing arm ball joints is preferably supported upon a depending support bracket fixed to the chassis and the rear end of each trailing arm is connected to a respective part of the telescopic axle beam by a vertically extending pivot joint. Preferably, each track change cylinder has one end pivotally connected to a rearwardly projecting bracket or anchorage point on the respective part of the telescopic axle beam and an opposite end connected to the chassis of the machine. This means that the part of the telescopic axle beam for the left-hand wheel can be moved inwardly and outwardly by a first track change cylinder, the other end of which is connected in pivotal manner to a right-hand chassis member, whereas the part of the telescopic axle beam for the right-hand wheel can be moved inwardly and outwardly by a second track change cylinder, the other end of which is pivotally connected to a left-hand chassis member. Accordingly, when the two track change cylinders are extended (they would normally be extended in unison), in order to increase the track of the two front wheels, the whole of the telescopic axle beam will move forward slightly as a result of outward movement of the two extending parts of the telescopic axle beam, this being permitted by the two trailing arms which are secured at their front end by ball joints to the chassis and at their rear end by the vertical pivots to the telescopic axle beam.

Because it is necessary for the left-hand front wheel to be steered by the same proportionate amount as the right-hand front wheel regardless of the spacing of the two front wheels (i.e. the wheel track distance), and it is also necessary, when it is desired to travel straight ahead, for the front wheels to remain in-line, or straight ahead, as the track changes, it is necessary to provide a special linkage between the steering arm associated with the left-hand wheel and the steering arm associated with the right-hand wheel. Accordingly, a left-hand steering relay bell crank lever and a right-hand steering relay bell crank lever is provided for each wheel, the left-hand bell crank lever being pivotally supported on a chassis member in the locality of the ball joint for the left-hand trailing arm, and the right-hand lever being pivotally secured to a chassis member in the vicinity of the ball joint for the right-hand trailing arm. Preferably, each of these steering relay bell crank levers has an inwardly extending lever arm and a rearwardly extending lever arm, and the two rearwardly extending lever arms being connected to each other by a cross-link of fixed length, one end of which is pivotally connected to the left-hand rearwardly extending lever arm and the opposite end of which is pivotally connected to the rearwardly extending right-hand lever arm. Preferably, the inwardly extending lever arm of the left-hand steering relay bell crank lever is pivotally connected to a front end of a fixed length left-hand drag link, the rear end of which is pivotally connected to an inner end of the inwardly extending steering arm of the left-hand wheel. Likewise, a right-hand drag link extends between the lever arm of the right-hand steering relay bell crank lever and the steering arm of the right-hand wheel by means of suitable pivotal connections. This results in the rear pivotal connection of each drag link being located vertically above the pivotal connection of each trailing arm to the telescopic axle beam at all times, regardless of the wheel track distance, and the pivotal connection at the front end of each drag link to the inwardly extending lever arm of the respective steering relay bell crank lever being located vertically above the ball joint connecting the leading end of the respective trailing arm to the chassis at all times. This allows the steering geometry for the front wheels to be uniform at all times and, in particular, ensures that the machine can be steered in a straight line, regardless of the track of the front wheels.

It is preferred that a telescopic suspension strut extending between an anchorage point on each extendable part of the telescopic axle beam and a chassis member of the machine, each of the pivots at each end of the struts being of a universal type, e.g. a compliant bush. Preferably, each wheel is independently driven by a hydraulic motor secured to a wheel hub in generally known manner.

A sweeping machine with variable track according to a preferred embodiment of the present invention is now described by way of example with reference to the accompanying drawings in which:

BRIEF DESCRIPTION OF THE SEVERAL VIEWS OF THE DRAWING(S)

DETAILED DESCRIPTION OF THE INVENTION

Figure 1:
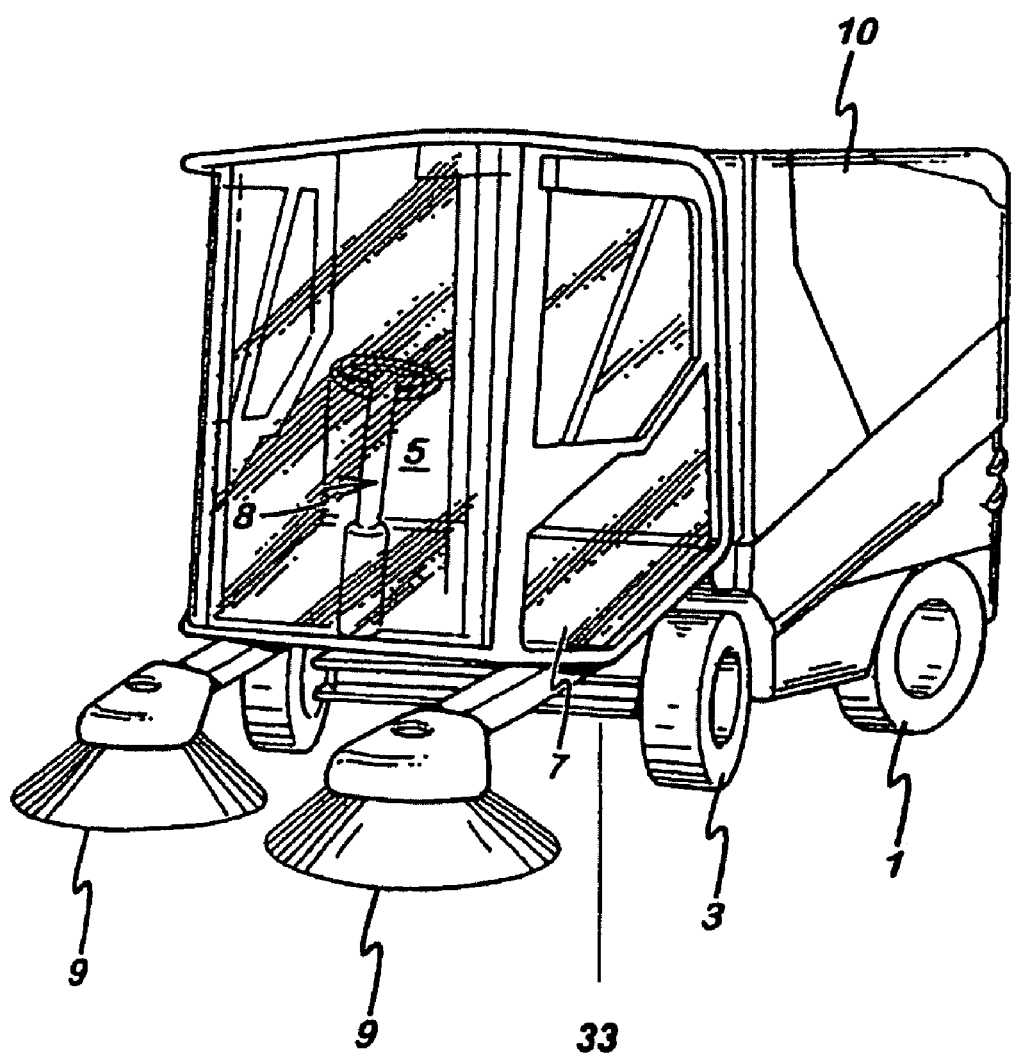
FIG. 1 is a perspective view of the sweeping machine.

Referring to FIG. 1, the sweeping machine is of a "compact" nature, and is provided with a pair of rear wheels (1) and a pair of steerable front wheels (3), an operator's cab (5) provided with a pair of doors (7) of the general construction disclosed in our co-pending U.K. Patent Application No. 01264118. As can be seen, the cab (5) is provided with an almost totally glass or other transparent material enclosure to maximise the operator's forward vision, and may be provided with all the normal operator comforts such as electronic control systems for reduced operator workload, a heated front windscreen, adjustable steering wheel (8) and an adjustable seat (not shown). The whole cab may be of the forward tilt type, e.g. to provide easy access to the main component parts of the machine, such as the engine and other known equipment for moving rubbish and other material swept up by a pair of front contra-rotating brushes (9) to a rubbish hopper (10) at the rear of the vehicle. The components may comprise a suction arrangement for sucking up material swept to a central location between the brushes (9) including an impeller and suitable ducting, and a primary dust separation system which may be of the cyclonic variety, together with optional air conditioning apparatus and a suspension and steering system for the front wheels (3) which will now be described in greater detail with reference to FIG. 2.

Figure 2:
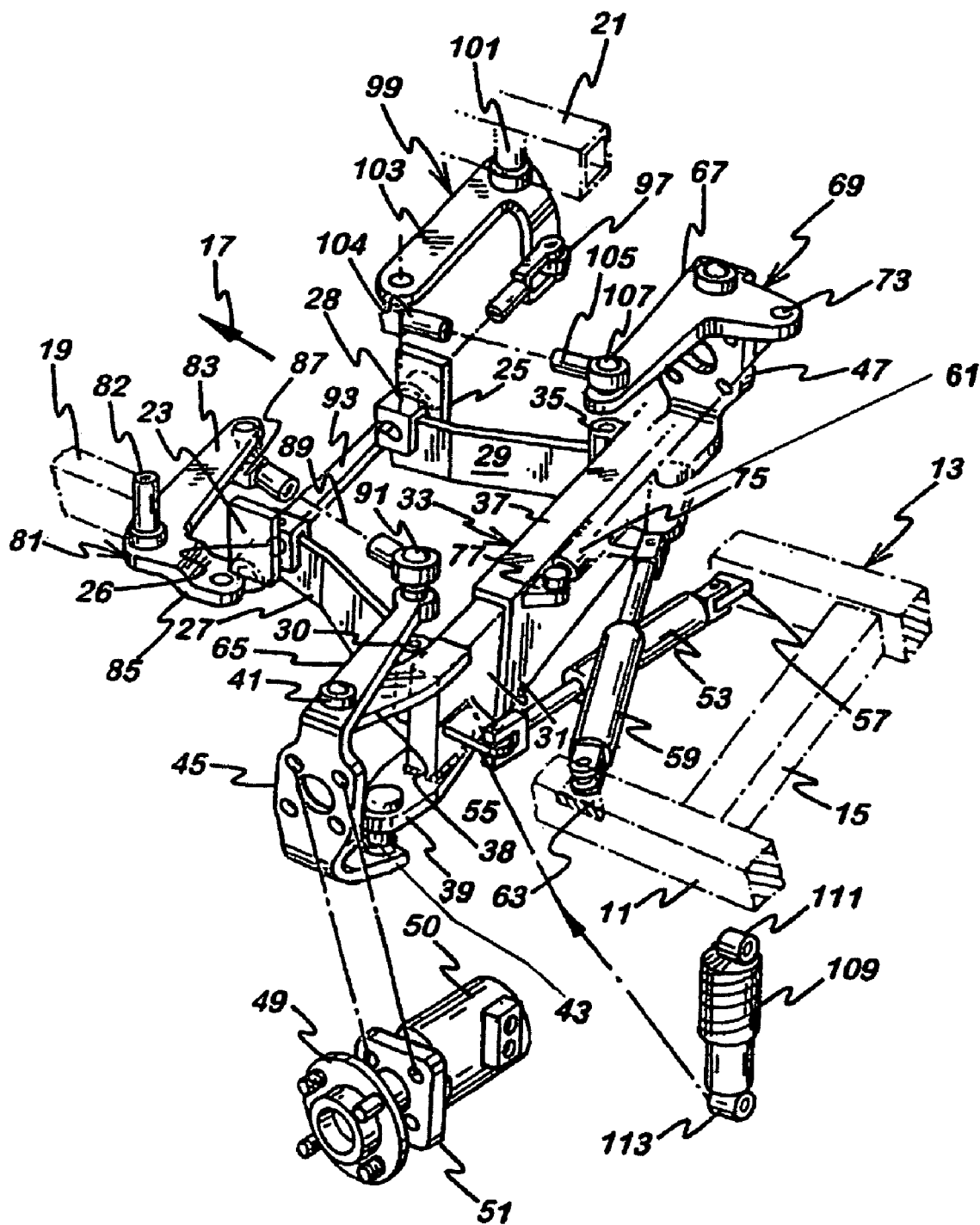
FIG. 2 is a perspective partly schematic scrap view, some parts of which are shown in an "exploded" position, of the wheel mounting, variable track and steering arrangement for the front wheels of the machine.

In FIG. 2, a main left-hand chassis member is shown at (11), and a main right-hand chassis member is shown at (13), the two members (11) and (13) being connected together by a transverse member (15). Further, fore and aft extending chassis members more towards a front end (17) of the machine are shown at (19) and (21). A depending support bracket (23) is connected to the left-hand suspension member (19) and a depending support bracket (25) is connected to the right-hand chassis member (21). A left-hand trailing arm (27) is pivotally supported at its front end by means of a ball joint (26) to the bracket (23), and at its rear end the trailing arm (27) is pivotally connected at (30) to a left hand part (31) of a telescopic axle beam (33). Likewise, a right-hand trailing arm (29) is also pivotally connected at its front end by means of a ball joint (28) to the depending support bracket (25) and, at its rear end, the trailing arm (29) is connected by means of a vertically extending pivot (35) to a right-hand extending part (37) of the telescopic axle beam (33). As illustrated, the left hand part (31) of the beam (33) is slidably located within the right-hand part (37). However, the opposite arrangement would be possible, or it is even envisaged that the two parts (31 and 37) could both be slidable within a central part, or vice-versa.

Upper and lower outrigger arms (38 and 39) extend outwardly from the left-hand extending axle part (31) and support respectively, an upper king pin (wheel swivel) ball joint (41) and a lower king pin wheel swivel ball joint (43). These two ball joints (41 and 43) support in known manner a left-hand wheel hub carrier (45). A right-hand wheel hub carrier (47) is supported in the same manner on the right-hand extending part (37) of the beam (33). A wheel hub (49) is supported by the wheel hub carrier (45) generally in known manner, there being a bracket (51) which is attached by bolts to the carrier (45). Rotation of the wheel hub (49) is by means of a hydraulic motor (50) which itself is supported on the bracket (51) and has a spindle extending from an outer end thereof for causing rotation of the wheel hub (49). A right-hand wheel hub is supported on the right-hand wheel hub carrier (47) in the same manner (not shown), rotation of its wheel hub being by means of a further hydraulic motor (not shown). The wheels (3) are mounted on the hubs (49) in the usual manner.

The left-hand part (31) of the telescopic axle beam (33) is moved between extended and retracted positions by a left-hand track change cylinder (53) extending between a rearwardly extending bracket (55) on the part (31) and a further bracket (57) projecting outwardly from the chassis member (13). The right-hand part (37) is moved between extended and retracted positions by a right-hand track change cylinder (59) extending between a further bracket (61) on the part (37) and a further bracket (63) on the chassis member (11). Each of the cylinders (53 and 59) is pivotally connected at each of its ends about a vertical pivot to its respective bracket.

Extending inwardly from the left-hand wheel hub carrier (45) is a steering arm (65) and likewise a further steering arm (67) extends inwardly from the right-hand wheel hub carrier (47). The right-hand steering arm (67) forms part of a bell crank lever shown generally at (69), a rearwardly extending lever arm of which is pivotally connected at (73) to one end of a hydraulic steering cylinder (75), the opposite end of which is pivotally connected to a rearwardly extending bracket (77) on a central part of the telescopic axle beam (33). Steering of the sweeping machine is by means of a hydrostatic system, this system passing hydraulic fluid to the steering cylinder (75) resultant upon steering motion of the steering wheel within the operator's cab (5). This is a generally known system which need not be described further herein.

When the track change cylinders (53 and 59) (which would normally be operated together in unison) are extended or retracted to change the lateral spacing between the wheel hub carriers (45 and 47) and thus change the track of the front wheels of the sweeping machine; the extending parts (31 and 37) will move in and out. This movement can be of the order of 120 mm for each part, meaning that the track of the front wheels of the machine can be extended from a minimum width of about 950 mm to a maximum width of about 1190 mm. Clearly, when the track is at its minimum dimension, the machine is at its narrowest which thus allows it to be used in confined positions such as in shopping precincts, on footpaths, at the like, where there may be obstructions. However, when the track is at its maximum dimension, then the stability of the machine is substantially increased, thus allowing the machine to be driven at a much faster speed. Normally, when the machine is at its narrowest (i.e. its position for sweeping) its maximum speed is of the order of about 10 miles per hour, but when the machine is at its widest, e.g. for travelling to and from a council depot from its position of use, the maximum speed is of the order of about 22 miles per hour. This is possible because the wider tracks gives the machine considerably increased stability even when its hopper (10) is fully loaded with up to about 1 ton of rubbish.

In border to maintain the correct steering geometry for the front wheels (3) of the machine regardless of the track width of the front wheels, it is necessary to provide a special mechanism since, of course, there cannot be a fixed steering link extending directly between the left-hand steering arm (65) and the right-hand steering arm (67) because they can move bodily towards and away from each other. Accordingly, a left-hand and a right-hand steering lever relay mechanism are provided. The left-hand steering lever relay mechanism comprises a bell crank lever (81) which is pivotally supported about a vertical pivot (82) on the left-hand chassis member (19). The bell crank lever has an internally extending lever arm (83) and a rearwardly extending lever arm (85). The free end of the lever arm (83) is pivotally connected by means of a ball joint (87) to the front end of a left hand, fixed length, drag link (89), the rear end of which is pivotally connected at (91) by means of a ball joint to the left-hand steering arm (65) of the wheel hub carrier (45). The rearwardly extending lever arm (85) of the bell crank lever (81) is connected by means of a vertical pivot to the left-hand end of a crosslink (93), the right-hand end of which is pivotally connected by means of a vertical pivot to a rearwardly extending lever arm (97) of a right-hand steering relay bell crank lever (99) pivotally supported by means of a vertically extending pivot (101) mounted on the right-hand chassis member (21). An inwardly extending lever arm (103) of this bell crank lever is pivotally connected by means of a ball joint (104) to the front end of a fixed length drag link (105), the opposite rear end of which is pivotally connected by means of a ball joint (107) to the inner end of the right hand steering arm (67) for the right-hand front wheel.

By virtue of the above described steering and suspension system, it will be noted that the respective pairs of joints (35, 107), (30, 91), (28 and 104) and (26 and 87), when in a neutral steering position, each have their respective joints on a common vertical axis, thus maintaining the steering geometry for the front wheels regardless of the wheel track dimension.

From the foregoing, it will be appreciated that fore and aft loads from the front telescopic axle beam are transmitted to the chassis via the two trailing links (27 and 29) whereas transverse loads are transmitted to the chassis via the track change cylinders (53 and 59). Vertical loads are transmitted by means of a pair of telescopic suspension struts, one of which is shown at (109). Each of these suspension struts has an upper and a lower end, the upper end being connected to the respective one of the extending parts (31 or 37) of the telescopic axle beam (33) by means of an upper compliant bush (111) and at its lower end to a respective one of the chassis members (11 or 13) by a lower compliant bush (113).

The rear wheels (1) are each provided with their own hydraulic drive motor (not shown).

While it is preferred that all four wheels are independently driven, hydraulically, it will be appreciated that other drive arrangements are possible.

Sensors, not shown, may be provided on the axle, or elsewhere, to determine when the telescopic axle has reached its extended or retracted positions. The sensors could then be connected to a display so that the extended or retracted status of the axle can be displayed to the operator in the cab, for example by way of a light or an icon on the dashboard display.

It will of course be understood that the present invention has been described above purely by way of example, and modifications of detail can be made within the scope of the invention.

The invention claimed is:

1. A sweeping machine, being a vehicle comprising a body supported by wheels, and a sweeping brush for sweeping litter and other debris, a pair of said wheels being carried by structure in which the distance between the wheels in said pair of wheels is adjustable, whilst the wheels are in contact with a road, so that the pair of wheels is set to a narrow track for sweeping and to a wide track for fast transport; wherein the said pair of wheels is steerable, the machine comprising a steering mechanism for steering the said pair of wheels wherein the pair of wheels is supported on a telescopic transverse axle beam, and each one of the pair of wheels is supported upon a wheel hub which is mounted upon a wheel hub carrier pivotally supported on upper and lower outrigger arms on the ends of the respective parts of the telescopic axle beam by means of upper and lower king pin wheel swivel ball joints.

2. A sweeping machine, being a vehicle comprising a body supported by wheels, and a sweeping brush for sweeping litter and other debris, a pair of said wheels being carried by structure in which the distance between the wheels in said pair of wheels is adjustable, whilst the wheels are in contact with a road, so that the pair of wheels is set to a narrow track for sweeping and to a wide track for fast transport; wherein the said pair of wheels is steerable, the machine comprising steering mechanism for steering the said pair of wheels; wherein the steering of the wheels is achieved using a hydrostatic system, the arrangement being such that operation of a steering wheel within the operator's cab will result in hydraulic fluid being delivered to a steering cylinder for steering wherein the pair of wheels is supported on a telescopic transverse axle beam and the steering cylinder extends between the telescopic axle beam and one arm of a bell crank lever attached to one of the wheel hub carriers, such that extension and retraction of the steering cylinder will cause pivotal movement of the bell crank lever about an upper king pin wheel swivel ball joint for the respective wheel.

3. A sweeping machine according to claim 2, wherein, in order to transfer steering movement of the wheel associated with the bell crank lever to the other wheel of the pair, another arm of the bell crank lever provides a steering arm for connection via a link system to a steering arm of the opposite wheel.

4. A sweeping machine, being a vehicle comprising a body supported by wheels, and a sweeping brush for sweeping litter and other debris, a pair of said wheels being carried by structure in which the distance between the wheels in said pair of wheels is adjustable, whilst the wheels are in contact with a road, so that the pair of wheels is set to a narrow track for sweeping and to a wide track for fast transport; wherein the said pair of wheels is steerable, the machine comprising steering mechanism for steering the said pair of wheels, wherein the whole of the telescopic axle beam is mounted on a pair of trailing arms which are supported relative to a chassis of the sweeping machine at first ends of the trailing arms by means of trailing arm ball joints; wherein each of the trailing arm ball joints is supported upon a depending support bracket fixed to the chassis and the second end of each trailing arm is connected to a respective part of the telescopic axle beam by a vertically extending pivot joint.

5. A sweeping machine, being a vehicle comprising a body supported by wheels, and a sweeping brush for sweeping litter and other debris, a pair of said wheels being carried by structure in which the distance between the wheels in said pair of wheels is adjustable, whilst the wheels are in contact with a road, so that the pair of wheels is set to a narrow track for sweeping and to a wide track for fast transport; wherein the said pair of wheels is steerable, the machine comprising steering mechanism for steering the said pair of, wherein a left-hand steering relay bell crank lever and a right-hand steering relay bell crank lever are provided, the left hand bell crank lever being pivotally supported on a chassis member of the sweeping machine in the locality of a ball joint for a left-hand trailing arm, and the right-hand lever being pivotally secured to a chassis member in the vicinity of a ball joint for a right-hand trailing arm.

6. A sweeping machine according to claim 5, wherein each of the steering relay bell crank levers has an inwardly extending lever arm and a rearwardly extending lever arm, and the two rearwardly extending rear arms being connected to each other by a crosslink of fixed length, one end of which is pivotally connected to the left-hand rearwardly extending lever arm and the opposite end of which is pivotally connected to the rearwardly extending right-hand lever arm.

7. A sweeping machine according to claim 6, wherein the inwardly extending lever arm of the left-hand steering relay bell crank lever is pivotally connected to a front end of a fixed length left-hand drag link, the rear end of which is pivotally connected to an inner end of the inwardly extending steering arm of the left-hand wheel, there also being a right-hand drag link extending between the lever arm of the right-hand steering relay bell crank lever and the steering arm of the right-hand wheel by means of suitable pivotal connections.

8. A sweeping machine, being a vehicle comprising a body supported by wheels, and a sweeping brush for sweeping litter and other debris, a pair of said wheels attached to carriers attached to a longitudinally adjustable elongated member in which the distance between the wheels in said pair of wheels is adjustable, while the wheels are in contact with a road, so that the pair of wheels is set to a narrow track for sweeping and to a wide track for fast transport, and said pair of wheels is coupled to a steer mechanism comprising a plurality of non-parallel members connected to a central steering member.

9. A sweeping machine according to claim 8, wherein the pair of wheels is supported on a telescopic transverse axle beam.

10. A sweeping machine according to claim 9, wherein a pair of track change hydraulic cylinders extend between a chassis of the sweeping machine and respective parts of the telescopic axle beam.

11. A sweeping machine according to claim 10, wherein each track change cylinder has one end pivotally connected to a rearwardly projecting bracket on the respective extending part of the telescopic axle beam and an opposite end connected to the chassis of the machine.

12. A sweeping machine according to claim 9, wherein the whole of the telescopic axle beam is mounted on a pair of trailing arms which are supported relative to a chassis of the sweeping machine at first ends of the trailing arms by means of trailing arm ball joints.

13. A sweeping machine according to claim 9, wherein a telescopic suspension strut extends between an anchorage point on each extendable part of the telescopic axle beam and a chassis member of the machine, each pivot at each end of the struts being of a universal type.

14. A sweeping machine according to claim 8, wherein each wheel is independently driven by a hydraulic motor secured to a wheel hub.

15. A sweeping machine according to claim 8, which has two pairs of wheels wherein at least one of the pairs of wheels is of variable track.

16. A sweeping machine according to claim 8, wherein the said pair of wheels is steerable, the machine comprising steering mechanism for steering the said pair of wheels.

17. A sweeping machine according to claim 16, wherein the steering mechanism comprises only four lever components, only three links linking the lever components, and a system for rotating one of the lever components, the system being operable by the operator of the sweeping machine.

18. A sweeping machine according to claim 16, wherein the steering of the wheels is achieved using a hydrostatic system, the arrangement being such that operation of a steering wheel within the operator's cab will result in hydraulic fluid being delivered to a steering cylinder for steering the wheels.

* * * * *